April 2, 1963 W. L. IKARD 3,084,288
ELECTRONIC DELAY LINE USING SEQUENTIALLY GATED VOLTAGE SAMPLERS
Filed June 1, 1959 3 Sheets-Sheet 1

Wallace L. Ikard  Inventor
By James G. Reilly  Attorney

United States Patent Office 3,084,288
Patented Apr. 2, 1963

3,084,288
ELECTRONIC DELAY LINE USING SEQUEN-
TIALLY GATED VOLTAGE SAMPLERS
Wallace L. Ikard, Tulsa, Okla., assignor to Jersey Production Research Company, a corporation of Delaware
Filed June 1, 1959, Ser. No. 817,408
4 Claims. (Cl. 328—177)

The present invention relates to the analysis of electrical phenomena and more particularly relates to methods and apparatus useful for delaying seismic signals and similar random electrical transients with respect to time.

Electronic data processing methods have been applied to the analysis of seismic signals and other complex electrical transients to an increasing extent in recent years. Of particular significance has been the development of methods and apparatus for the time domain analysis of such signals. These methods and apparatus are considerably more versatile than systems formerly used for this purpose and make possible operations which were considered infeasible in the past. In essence, time domain analysis of an electrical signal involves the extraction of samples of the input signal at delayed intervals, the weighting of these extracted samples according to some impulse response which constitutes the desired signal characteristic, and the mixing of the weighted components to obtain a corrected signal. Such an operation is referred to as a time domain operation because it is carried out on the input information by superposition of all the past time values of the information, weighting the values in terms of their effect at a later time. Earlier systems of analysis, on the other hand, operated primarily in the frequency domain and were based on the response of the input information to the various frequency components of the information, that is, on the superposition of frequency effects. Analytical operations carried out in the time domain have many advantages over those employed in the past. The most pronounced of these is the flexibility of time domain methods of analysis, particularly for creating filters which cannot be created with ordinary circuitry, for analyzing time functions for their frequency contents, for correlating one signal with another, and for the insertion of corrections in a signal.

The heart of any time domain processing system is a tapped delay line which will permit the extraction of samples of the input information at regular delayed intervals. In the past, delay lines employed for this purpose have been either rotating magnetic delay lines or lumped constant delay lines. A rotating magnetic delay line consists essentially of a rotating drum carrying a magnetic recording medium on its surface, a recording head for applying a modulated input signal to the medium, a series of spaced pickup heads and corresponding demodulators adapted to recover the signal at intervals as the drum rotates, and means for erasing the signal at the end of each rotation of the drum. Delay lines of this type are reasonably effective and permit a certain amount of flexibility in the delay period to be obtained by varying the rotational speed of the drum. Their usefulness is somewhat restricted, however, because of limitations on the number of delay taps which practical considerations of drum diameter and playback head size impose. Lumped constant delay lines consist of conventional lumped constant inductance and capacitance elements arranged in a network and provided with delay taps at periodic intervals along the length of the network. Delay lines of this latter type are generally less satisfactory than rotating magnetic delay lines, particularly for use in seismic applications, because their frequency response becomes unduly limited when long delay periods and large numbers of delay taps are required.

The present invention provides an electronic delay line suitable for use in time domain data processing systems and similar applications which is free of the disadvantages which have characterized and, to some extent, limited the application of the rotating magnetic delay lines and lumped constant delay lines used in the past. In accordance with the invention, seismic signals and similar random electrical transients are delayed by sampling and holding the input signal voltage over discrete periodic time increments whose frequency is at least twice the highest frequency in the input signal. By thus sampling and holding the input signal voltage, a stair-step waveform representative of the input signal is obtained. Each constant voltage period in this stair-step waveform is then sampled at a delayed time in a second sampling operation and the voltage samples thus obtained are held for time increments equivalent to those used in the initial sampling operation. A second stair-step waveform is obtained which is identical to the initial input signal but is displaced therefrom with respect to time. Additional displaced waveforms may be produced sequentially in like manner in order to increase the time displacement from the original input signal. The final waveform obtained may then be smoothed to duplicate the amplitude and frequency characteristics of the input signal. This method of delaying electrical signals is much simpler than methods employed heretofore, permits the delay time to be more easily adjusted or controlled than did earlier methods, and does not suffer from the frequency response and size limitations which have characterized delay lines employed in the past.

The apparatus utilized in carrying out the method of the invention broadly comprises an oscillator and pulse shaper or other source of sharply-peaked periodic electrical impulses which serve to control the frequency of the sampling operation, a sequence-operated counting circuit responsive to the sharply-peaked pulses for governing the order of sampling, a plurality of sample-and-hold circuits sequentially responsive to impulses passed by the counting circuit for taking and holding voltage samples, circuitry for passing the input signal through the sample-and-hold stages in series, and delay taps which permit the recovery of delayed signals from the sample-and-hold circuits. Conventional components which will readily be recognized by those skilled in the art and are available from commercial sources can be assembled in accordance with the invention and utilized for the purposes thereof.

The exact nature and objects of the invention can best be understood by referring to the following description of the methods and apparatus employed in its practice and to the accompanying drawing in which.

Figure 1:
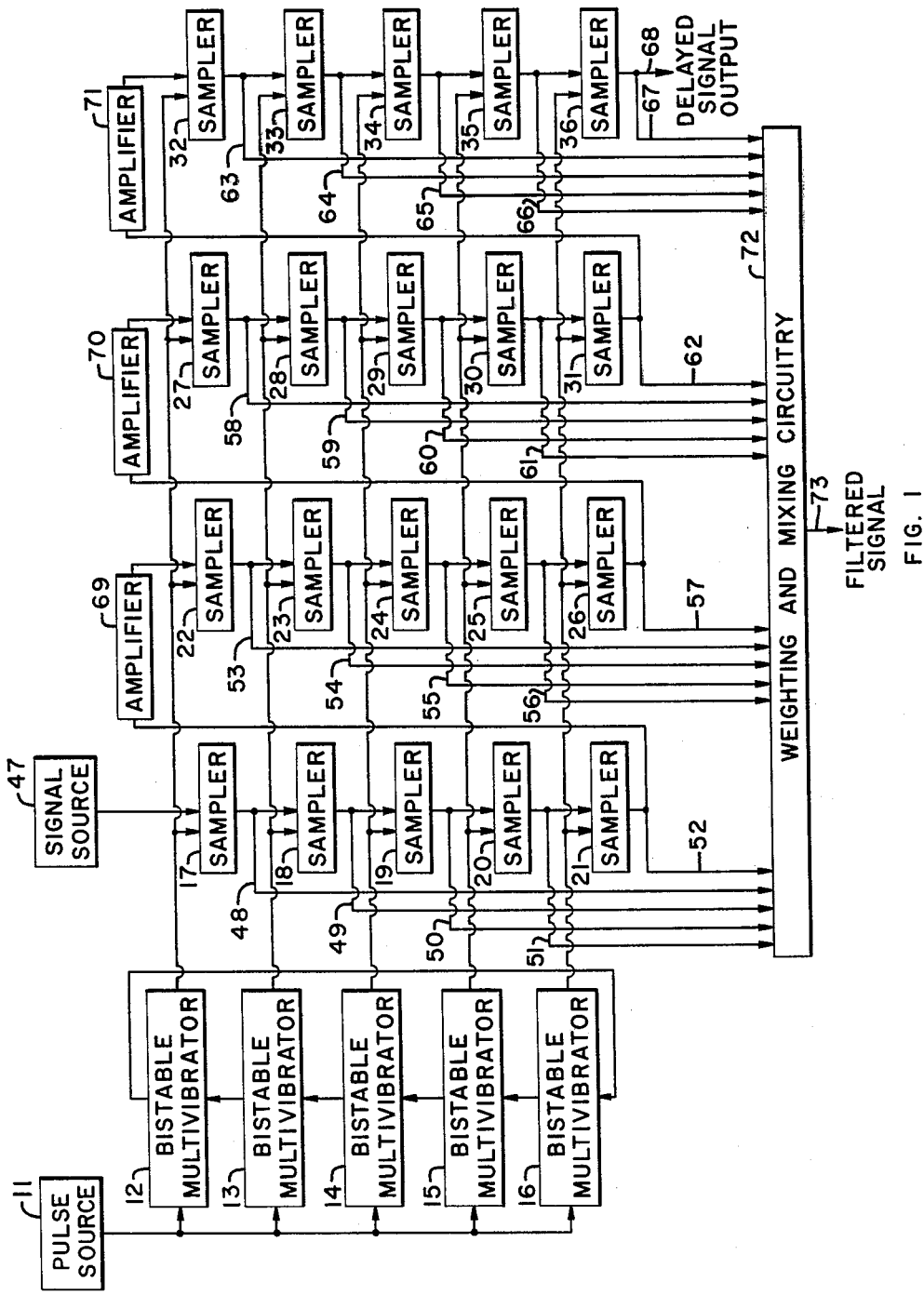
FIG. 1 depicts schematically an electronic delay line useful in carrying out the method of the invention.

Turning now to FIG. 1, reference numeral 11 designates a source of periodic sharply-peaked electrical impulses. Normally, source 11 will consist of an oscillator and, in some cases, a pulse shaper to produce pulses of sharply-peaked characteristics, but other sources of such periodic pulses may be utilized. A number of pulse generators productive of suitable impulses are well known and will be familiar to those skilled in the electronic arts. The frequency of the pulses from source 11 precisely controls the sampling frequency of the apparatus and hence controls the delay time attained by the apparatus. The pulse frequency employed will therefore depend somewhat upon the applications for which the delay line apparatus is intended and upon the delay periods desired. In the apparatus shown in FIG. 1, a five-stage counting circuit is used and hence the sampling frequency is one-fifth of the pulse frequency. For seismic applications of the apparatus of the invention, the pulse frequency will normally be such that the sampling frequency ranges between about 200 cycles per second and about 2000 cycles per second. A wide range in sampling frequencies may be used in carrying out the invention, however, so long as the actual frequency employed is constant and is at least twice the highest frequency in the input signal. It is preferred that the constant sampling frequency be four or more times the highest signal frequency. Provisions may be made for altering the delay characteristics of the apparatus by varying the pulse frequency in order to increase the versatility of the apparatus. The method employed for varying pulse frequency will, of course, depend upon the particular source of pulses utilized.

The periodic electrical impulses emitted from source 11 are fed to a multi-stage, sequence-operated counting circuit, shown in FIG. 1 as a sequence-operated ring counter. The ring counter depicted is made up of interconnected bistable multivibrators 12, 13, 14, 15 and 16 which serve as gate generators to control the operation of the sampling circuits. The multivibrators are conventional circuits having two stable states which complete one cycle for each two impulses received. Such circuits are commonly referred to as trigger circuits, Eccles-Jordan trigger circuits, or scale-of-two circuits. Each multivibrator operates in sequence as it receives an impulse from source 11 and an impulse from the multivibrator preceding it in the ring counter. The output from each multivibrator consists of positive and negative impulses which are used to trigger the operation of the sampling circuits of the apparatus. It will be understood that the use of a ring counter may be dispensed with in favor of other sequence-operated counting devices. Gas-filled counting tubes such as the "Dekatron" and suitable auxiliary circuitry, mechanical commutator switches and numerous other sequence-operated counting devices can be employed in lieu of the ring counter circuitry shown in FIG. 1. Such counting devices are widely used in radar systems, coder and decoder devices, and many other applications and hence are well known in the art.

One or more sample-and-hold circuits, designated by reference numerals 17 through 36 in FIG. 1, is controlled by the output from each multivibrator in the ring counter circuit or similar counting device utilized in the apparatus. These sample-and-hold circuits may consist essentially of two cathode follower stages which are activated upon receipt of positive and negative gating pulses from the appropriate multivibrator. Each sample-and-hold circuit samples the voltage of the input signal applied to it and holds that voltage for a discrete period of time, after which the voltage is again sampled and held. The frequency with which sampling occurs is determined by the frequency of the positive and negative impulses from the multivibrator to the sample-and-hold circuit. Although a total of 20 sample-and-hold circuits are shown in the apparatus of FIG. 1, it will be understood that a greater or lesser number of sampling circuits may be provided, depending upon the total delay period to be produced by the delay line apparatus and the applications for which the apparatus is intended. It has been found that for some applications in which the apparatus and method of the invention may be employed, 250 or more separate sampling stages are useful. Sometimes it may be found desirable to arrange these sampling stages in banks which can be interconnected to produce a long delay line or disconnected when only a short delay line having a small number of delay taps is required.

Figure 2:
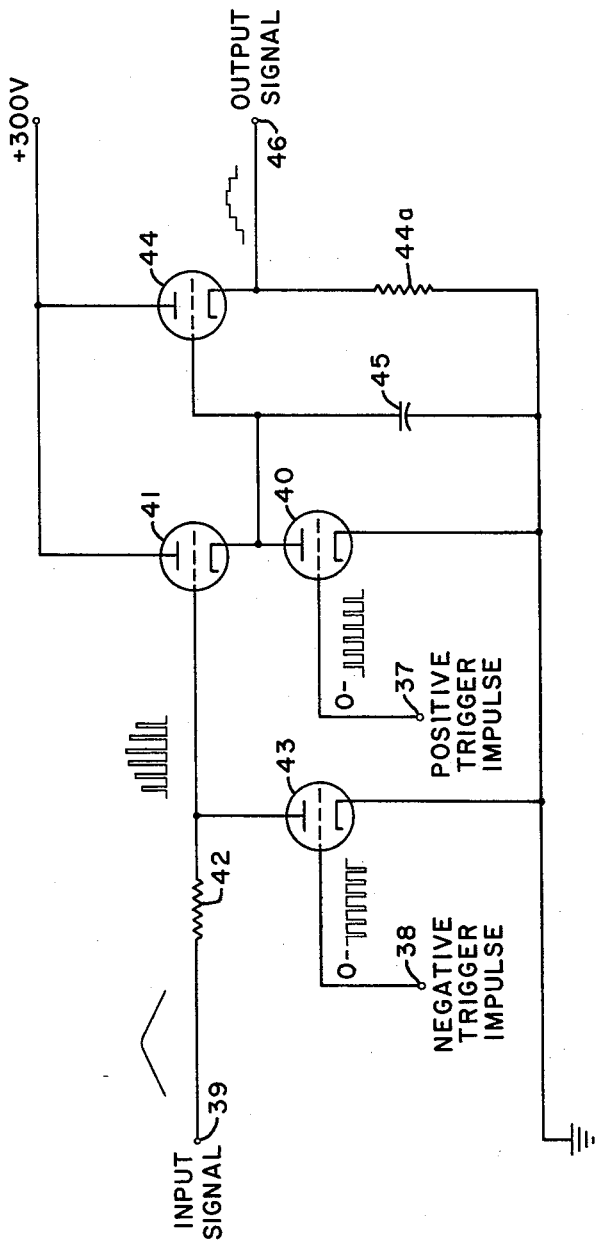
FIG. 2 is a circuit diagram of a sample-and-hold circuit suitable for use in the apparatus of FIG. 1; and, FIG. 3 is a graphical representation of waveforms produced from the input signal during the operation of the apparatus of FIG. 1.

The operation of the sample-and-hold circuit employed in the apparatus of FIG. 1 can be better understood by referring to FIG. 2 of the drawing which is a schematic diagram of this circuit. As can be seen from FIG. 3, each voltage sampling circuit employs four triodes, two resistors and a capacitor. Two of these triodes, triodes 40 and 43, could readily be replaced by diodes and appropriate control circuitry. Transistors might also be employed in place of electron tubes. The sampling action is activated by the simultaneous application of the positive and the negative gate pulses from the multivibrator connected to the circuit. The triggering impulses are fed to positive gate terminal 37 and negative gate terminal 38 in the sampling circuit. Since in the apparatus of FIG. 1 the triggering impulses are obtained from a five-stage ring counter, the ratio of the length of the impulses to the interval between impulses will be 1 to 4.

The input signal to be sampled by the sampling circuit depicted in FIG. 2 of the drawing is fed into the circuit through terminal 39. Prior to the arrival of the input signal, triodes 40 and 41 are held cut off, triode 40 by the positive gate signal applied at terminal 37 and triode 41 by the drop across resistor 42 caused by current flow through triode 43. Triode 44 provides a low impedance replica of the voltage on storage condenser 45. When the input signal to be sampled arrives at the sampling circuit, triode 43 is cut off, allowing the voltage on the grid of triode 41 to rise to the level of the input signal. Simultaneously, triode 40 is turned on, providing a cathode resistor for triode 41. Storage capacitor 45 is therefore charged to the new signal level. Immediately after the sample is stored on capacitor 45, triode 43 is turned on and triode 40 is cut off. This leaves capacitor 45 free floating, holding the grid of triode 44 at signal level. Triode 44 with cathode resistor 44a provides a low impedance output source at terminal 46 for the storage capacitor signal. The output signal from the voltage sampling circuit is thus a stair-step representation of the input signal applied to the circuit. This output signal serves as the input signal for the succeeding sampling circuit. It will be understood that the sampling circuit thus described is merely representative of circuitry useful in practicing the method of the invention and that the method is not limited to the use of any particular sample-and-hold circuit. A number of other sample-and-hold circuits which might be employed in the apparatus of the invention with minor and obvious modifications are described in chapter 14 of "Waveforms" by Chance et al., volume 19 of the Massachusetts Institute of Technology Radiation Laboratory Series, published by the McGraw-Hill Book Company of New York.

The random electrical signal to be delayed by means of the apparatus shown in FIG. 1 is fed into the system from signal source 47 in FIG. 1. In seismic applications of the invention, this signal source will ordinarily constitute a magnetic tape or similar reproducible record and associated playback equipment, but other signal sources may be utilized, particularly in non-seismic applications of the method and apparatus. The input signal is fed into sample-and-hold circuit 17 where a stair-step representation of the signal is produced in the manner described in the preceding paragraph. The operation of sample-and-hold circuit 17 is controlled by impulses from bi-stable multivibrator 12. The resultant stair-step waveform is then passed to sample-and-hold circuit 18 where, in response to positive and negative impulses from bi-stable multivibrator 13, it is sampled and held at the same frequency but at intervals displaced in time from the sampling interval in the preceding sample-and-hold circuit. A sample of the stair-step output of sample-and-hold circuit 17 is recovered by means of delay tap 48. In similar manner, the input signal proceeds through the bank of sample-and-hold circuits. The output of each circuit serves as the input for the succeeding circuit. A delayed voltage sample is recovered from each circuit and taken off through delay taps 48 through 67. The final delayed output signal is recovered by means of line 68. The total delay of this output signal with respect to the original input signal will be the sum of the incremental time values over which the signal was delayed in the sample-and-hold circuits. The output signal, a stair-step representation of the original signal, may be smoothed by conventional means if desired. In many applications of the apparatus such smoothing is unnecessary, particularly where high sampling frequencies are utilized, because the stair-step output waveform cannot be differentiated from a smoothed waveform in such applications.

Figure 3:
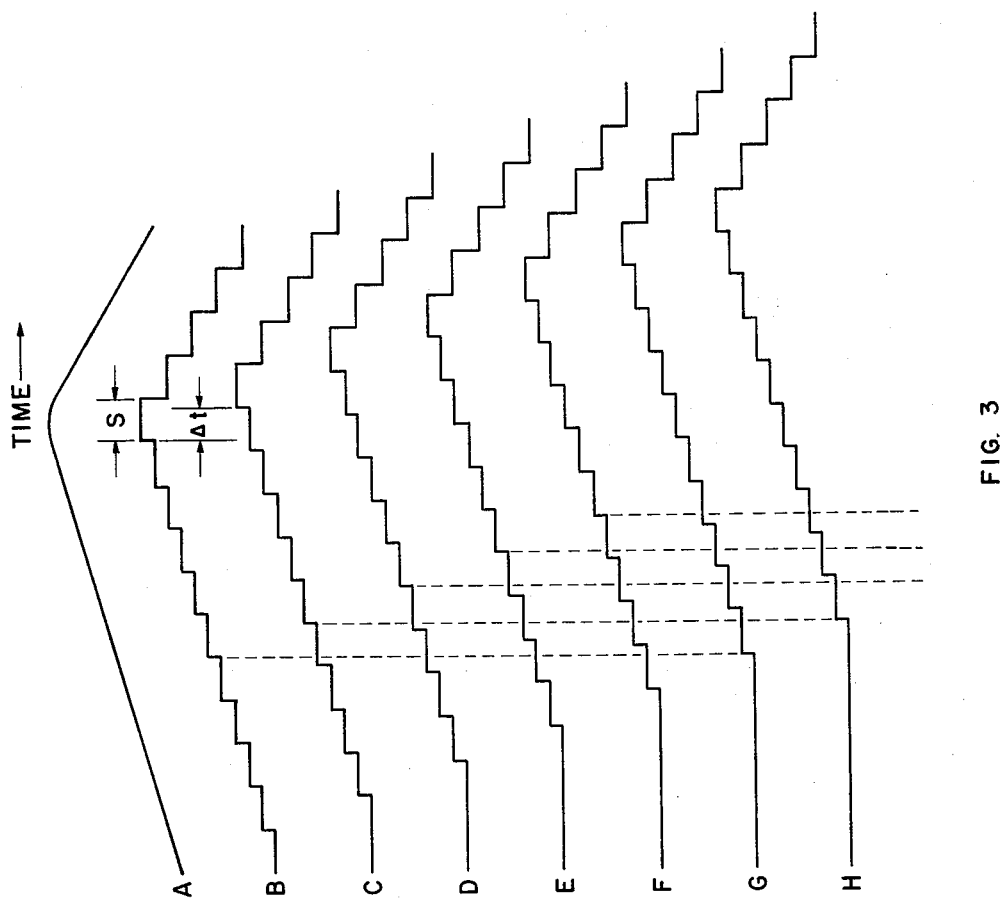

The method of the invention can be better understood by examining the waveforms produced from the original input signal in carrying out the method. Turning now to FIG. 3 of the drawing, the input signal fed from source 47 into sampler 17 is represented by waveform A of FIG. 3. The stair-step waveform produced in sample-and-hold circuit 17 by sampling the input signal at regular intervals and holding each voltage sample until the succeeding sample is taken is shown as waveform B. This waveform consists of a series of constant voltages of equal duration and closely resembles the original input signal. As can be seen from FIG. 3, the frequency with which samples are taken exceeds the frequency of the input signal by a factor greater than two. Waveform B is then fed into sampling circuit 18 where it is sampled at the same frequency with which the original signal was sampled. Due to the time lag between the pulses emitted by bistable multivibrator 12 and those emitted by multivibrator 13, sampling in sample-and-hold circuit 18 occurs at a discrete time interval after sampling takes place in sample-and-hold circuit 17. A second stair-step waveform displaced from the first by a time period $\Delta T$ is thus produced. $\Delta T$ constitutes the delay period for one sampling stage. Similar stair-step waveforms, each delayed from the preceding by a time period $\Delta T$ which is constant, are produced in the succeeding sample-and-hold circuits. These are shown in FIGURE 3 as waveforms C, D, E, F and the like. The total delay of the output signal obtained by means of line 68 is thus the product of $\Delta T$ times the number of individual delay stages in the delay line. Increasing the number of sampling stages thus obviously increases the total delay time of the apparatus.

Since sample-and-hold circuits 17, 22, 27 and 32 in the apparatus of FIG. 1 are triggered by impulses from bistable multivibrator or gate generator 12 at the same time, these sample-and-hold circuits operate in unison. In like manner, each of the other bistable multivibrators in the ring counter shown triggers four sample-and-hold circuits. Every fifth sample-and-hold circuit thus samples at the same time and therefore the delay period for each sampling circuit or stage will be four-fifths of the sampling period. The sampling period in seconds per cycle is the reciprocal of the sampling frequency in cycles per second. As pointed out previously, the sampling frequency is determined by the frequency of the input pulses from pulse source 11 and can be altered by varying the frequency of source 11. This relationship between sampling period S and delay period $\Delta T$ will be the same for any apparatus employing a five-stage ring counting circuit. The relationship may be changed by changing the number of stages in the ring counter. In a ring counter employing four bistable multivibrators or gate generators, for example, every fourth sampling circuit in the series would be triggered simultaneously and hence the delay period would be three-fourths of this sampling period. It is thus obvious that the relationship between the delay period $\Delta T$ and the sampling period S is governed by the number of gate generators used to control the delay line and that the apparatus of the invention is not limited to the use of a five-stage ring counter or similar sequence-operated counting device as depicted in FIG. 1 of the drawing.

As pointed out heretofore, the sample-and-hold circuit shown in FIG. 2 of the drawing essentially involves two cathode-follower stages. When a sampling device of this type is utilized, the amplitude of the output signal of each sampler is somewhat lower than that of the input signal. In order to compensate for this loss in signal level and to maintain a reasonable operating level, booster amplifiers may be provided at periodic intervals in the delay line circuit. Conventional amplifiers requiring only a small amount of gain may be employed for this purpose and may be heavily fed back in order to maintain stability throughout the amplified portion of the circuit. Amplifiers 69, 70 and 71 are provided for this purpose in the apparatus shown in FIG. 1 of the drawing.

The delay line apparatus of the invention and the method embodied therein may be employed for applying time corrections to seismic data and similar electrical transients but are particularly useful in the time domain filtering of seismic signals and similar complex electrical signals. The apparatus may be employed as a time domain filter by simply weighting and mixing the delayed output signals obtained from each of the individual sample-and-hold circuits. Weighting and mixing may be achieved by connecting the delayed signals through series resistors to the appropriate points in a mixing resistor string. The series resistors will preferably be made much larger than the mixing resistors in order to prevent interaction of the weightings. Other weighting and mixing methods employed heretofore in conjunction with time domain filter apparatus may also be used. Weighting and mixing components are designated by reference numeral 72 in FIG. 1. The filtered signal output is indicated by reference numeral 73 of FIG. 1.

In time domain processing operations, the delayed signals are mixed with appropriate weighting to correspond to the time function of the desired operation. Since a wide variety of different processing operations may be carried out with such apparatus, it is frequently necessary to change the weighting applied to each output. As mentioned earlier, large time domain processing units may have 250 or more separate output taps and hence such changes in weighting will require considerable time if carried out with potentiometers, switches, or by patch board programming methods. To avoid this difficulty, the use of commercially available card-programmed switches or similar automatic means to accomplish the weighting and mixing is desirable. The use of such means makes it possible to change the weightings of the various delay taps very rapidly. Using card program switches, for example, the weightings of 20 or more separate output stages can be set in steps of 1% or less by simply inserting a punched file card having prearranged holes therein. The program switches consist essentially of vertical and horizontal leads innerconnected by an appropriate mixing resistor string. Any vertical lead and any horizontal lead in the switch may be tied together by simply punching a hole in the programming card at the intersection point. The use of such switches and program cards will be readily apparent to those skilled in the art.

It is to be understood that many modifications in the method and apparatus disclosed herein may be made without departing from the scope of the present invention. Numerous gate generator and sample-and-hold circuits aside from those specifically described may be employed. The sample-and-hold circuits and associated components may, if desired, be made up in groups of 20 stages, for example, and interconnected by means of patch cords if units having a greater number of stages are needed. Delay tap spacings ranging from about $\frac{1}{10}$ to 10 or more milliseconds may be provided, depending upon the sampling frequency utilized. These and other modifications of similar character will be apparent to those skilled in the art.

What is claimed is:

1. Apparatus for delaying an electrical signal which comprises:

(a) a source of electrical pulses having a predetermined frequency;

(b) a multi-stage counting device connected to said source, each stage in said counting device including means responsive to pulses from said source and pulses from a preceding stage for producing periodic control pulses;

(c) a plurality of sampling circuits connected in cascade to form a bank of said circuits, each of said sampling circuits being connected to one stage of said counting device whereby control pulses from said counting device are fed to said sampling circuits in sequence and each including means for sampling an input voltage in response to said control pulses and holding the sample voltage constant until a succeeding sample is taken;

(d) means for introducing an input electrical signal into a first sampling circuit in said bank of sampling circuits; and (e) means for recovering a delayed output signal from a second sampling circuit in said bank of sampling circuits.

2. Apparatus for delaying an electrical signal which comprises:

(a) a pulse generator for producing sharply peaked electrical pulses at constant frequency;

(b) a multi-stage ring counter connected to said generator, each stage in said ring counter including means responsive to pulses from said generator and pulses from a preceding stage for producing periodic control pulses;

(c) a plurality of sampling circuits connected in cascade to form a bank of sampling circuits, each of said sampling circuits being connected to said ring counter whereby said circuits operate in sequence in response to control pulses from said counter and each sampling circuit including two cathode follower stages for repeatedly sampling an input voltage in response to said control pulses and holding each voltage sample constant until the succeeding sample is taken;

(d) means for introducing an electrical signal into a first sampling circuit in said bank of sampling circuits; and (e) a delay tap for recovering a delayed signal from a second sampling circuit in said bank of sampling circuits.

3. Apparatus as defined by claim 2 including multiple delay taps for the recovery of delayed signals from each of a plurality of sampling circuits in said bank and means for weighting and mixing said delayed signals.

4. Apparatus for the time domain analysis of an electrical signal which comprises:

(a) a pulse generator for producing sharply peaked electrical pulses at a predetermined constant frequency;

(b) a multi-stage ring counter connected to said generator, each stage in said ring counter including means responsive to electrical pulses from said pulse generator and pulses from a preceding stage for producing simultaneous positive and negative control pulses;

(c) a plurality of sampling circuits connected in cascade to form a bank of sampling circuits, each of said sampling circuits being connected to one stage of said ring counter whereby said circuits operate in sequence in response to control pulses from said generator and each sampling circuit including two cathode follower stages for sampling an input voltage in response to the simultaneous arrival of positive and negative control pulses from said ring counter and holding the sampled voltage constant until the arrival of the next succeeding positive and negative pulses of said counter;

(d) input terminals for introducing an electrical signal into the initial sampling circuit in said bank of sampling circuits;

(e) delay taps for recovering delayed signals from a plurality of sampling circuits in said bank of sampling circuits; and (f) means for weighting and mixing delayed signals recovered from said delay taps.

References Cited in the file of this patent

UNITED STATES PATENTS

| | | |
|---|---|---|
| 2,294,863 | Hadfield | Sept. 1, 1942 |
| 2,553,284 | Sunstein | May 15, 1951 |
| 2,651,718 | Levy | Sept. 8, 1953 |
| 2,753,452 | McCardle | July 3, 1956 |
| 2,878,999 | Lindsey et al. | Mar. 24, 1959 |
| 2,921,738 | Greening | Jan. 19, 1960 |
| 2,953,645 | Schoeder | Sept. 20, 1960 |
| 3,007,114 | Pastoriza | Oct. 31, 1961 |